United States Patent
Ono

(10) Patent No.: US 9,025,041 B2
(45) Date of Patent: May 5, 2015

(54) SOLID-STATE IMAGING APPARATUS AND METHOD FOR DRIVING THE SAME

(71) Applicant: Canon Kabushiki Kaisha, Tokyo (JP)

(72) Inventor: Toshiaki Ono, Ebina (JP)

(73) Assignee: Canon Kabushiki Kasha, Tokyo (JP)

( * ) Notice: Subject to any disclaimer, the term of this patent is extended or adjusted under 35 U.S.C. 154(b) by 130 days.

(21) Appl. No.: 13/724,891

(22) Filed: Dec. 21, 2012

(65) Prior Publication Data

US 2013/0182157 A1 Jul. 18, 2013

(30) Foreign Application Priority Data

Jan. 18, 2012 (JP) ................................ 2012-008325

(51) Int. Cl.
| | |
|---|---|
| H04N 5/225 | (2006.01) |
| H04N 5/335 | (2011.01) |
| H04N 5/357 | (2011.01) |
| H04N 5/365 | (2011.01) |
| H04N 5/378 | (2011.01) |

(52) U.S. Cl.
CPC ............. *H04N 5/335* (2013.01); *H04N 5/3575* (2013.01); *H04N 5/365* (2013.01); *H04N 5/378* (2013.01)

(58) Field of Classification Search
USPC .............. 348/220.1, 222.1, 231.99, 294, 298, 348/302, 308, 312
See application file for complete search history.

(56) References Cited

U.S. PATENT DOCUMENTS

| | | | |
|---|---|---|---|
| 7,787,037 B2 | 8/2010 | Ono et al. ..................... | 348/296 |
| 7,817,199 B2 | 10/2010 | Yamashita et al. ............ | 348/308 |
| 7,986,353 B2 | 7/2011 | Ono .............................. | 348/241 |
| 8,085,319 B2 | 12/2011 | Ono et al. ..................... | 348/241 |
| 2012/0140089 A1* | 6/2012 | Koh et al. ................... | 348/220.1 |
| 2013/0016264 A1 | 1/2013 | Ono .............................. | 348/308 |

FOREIGN PATENT DOCUMENTS

JP 2005-323331 A 11/2005

OTHER PUBLICATIONS

U.S. Appl. No. 13/712,662, filed Dec. 12, 2012.

* cited by examiner

*Primary Examiner* — Yogesh Aggarwal
(74) *Attorney, Agent, or Firm* — Fitzpatrick, Cella, Harper & Scinto

(57) ABSTRACT

A solid-state imaging apparatus includes: a plurality of pixels; a reference signal generating circuit configured to generate a ramp signal; a counter performing a counting operation according to the changing of the ramp signal; a read out circuit having a comparator comparing a signal read out from the pixel with the ramp signal, and converting an analog signal outputted from the pixel to a digital signal; and a control circuit configured to adjust a reset potential to be used when the comparator is reset, wherein the control circuit obtains a conversion value derived by converting an analog signal derived of a reset level of the pixel to a digital signal, and adjusts a reference potential based on the conversion value to make a dynamic range of A/D conversion follow the fluctuation of the reset level of the pixel.

8 Claims, 11 Drawing Sheets

SOLID-STATE IMAGING APPARATUS AND METHOD FOR DRIVING THE SAME

BACKGROUND OF THE INVENTION

1. Field of the Invention

The present invention relates to a solid-state imaging apparatus and a method for driving the same.

2. Description of the Related Art

A solid-state imaging apparatus having an analog-to-digital conversion circuit (A/D conversion circuit) mounted thereon converts an analog signal derived of a reset level outputted from a pixel to a digital signal, subsequently converts an analog signal derived of a signal level outputted from the pixel after the photoelectric conversion to a digital signal, and a difference between these two digital values is determined to be a pixel value of a captured image. By thus subtracting the reset level from the signal level after the photoelectric conversion and removing the variation of the reset level, an adequate image can be obtained (Japanese Patent Application Laid-Open 2005-323331).

SUMMARY OF THE INVENTION

Here, a digital value which is a result obtained by converting an analog signal derived of a reset level of a pixel to a digital signal fluctuates due to product variation, thermal drift or the like. Furthermore, the digital value which is a result derived by having converted the analog signal derived of the reset level of the pixel to the digital signal fluctuates also due to an offset, a reference potential or the like of a comparator that a read out circuit has which reads out signals outputted from pixels. In order to surely convert the analog signal derived of the reset level of the pixel to the digital signal, a dynamic range when the analog signal derived of the reset level is converted to the digital signal needs to be sufficiently wide in consideration of the fluctuation of the reset level. For instance, in the technique described in Patent Document 1, the dynamic range in the A/D conversion of the analog signal derived of the reset level is widened, and accordingly an A/D conversion period of time needs to be elongated. However, it hinders the speed of reading out a pixel signal from being increased to elongate the A/D conversion period of time.

According to an aspect of the present invention, a solid-state imaging apparatus comprises a plurality of pixels arranged two dimensionally, a reference signal generating circuit configured to generate a reference signal of which voltage changes monotonically with time; a counter performing a counting operation according to the changing of the reference signal, a read out circuit having a comparator comparing a signal outputted from the pixel derived of the reference signal, and analog-to-digital converting the signal outputted from the pixel based on an output from the comparator and a count value of the counter, so as to perform an operation of analog-to-digital conversion of a reset level of the pixel, and to perform an operation of analog-to-digital conversion of the signal derived of the pixel, and a control circuit configured to obtain a conversion value derived by the analog-to-digital conversion of the reset level of the pixel, and to adjust, based on the conversion value, a reference voltage based on which the comparator is reset.

Further features of the present invention will become apparent from the following description of exemplary embodiments with reference to the attached drawings.

DESCRIPTION OF THE EMBODIMENTS

Preferred embodiments of the present invention will now be described in detail with reference to the accompanying drawings.

(First Embodiment)

The first embodiment of the present invention will be described below.

Figure 1:
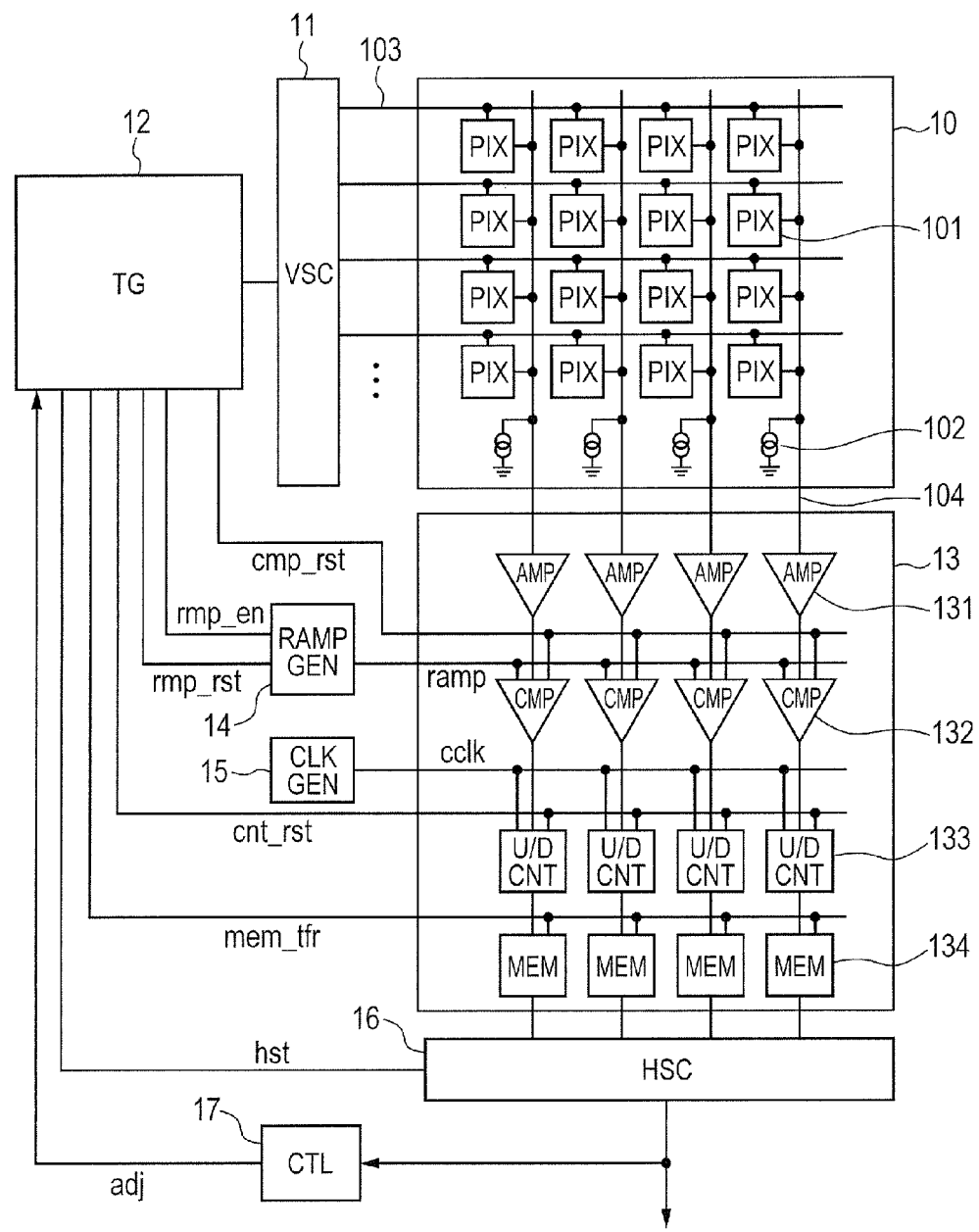
FIG. 1 is a view illustrating a configuration example of a solid-state imaging apparatus according to a first embodiment of the present invention.

FIG. 1 is a view illustrating a configuration example of a solid-state imaging apparatus according to the first embodiment. The solid-state imaging apparatus according to the first embodiment has a pixel portion 10, a vertical scanning circuit 11, a timing generating circuit 12, a read out circuit 13, a reference signal generating circuit 14, a clock generation circuit 15, a horizontal scanning circuit 16 and a control circuit 17 therein.

Figure 2:
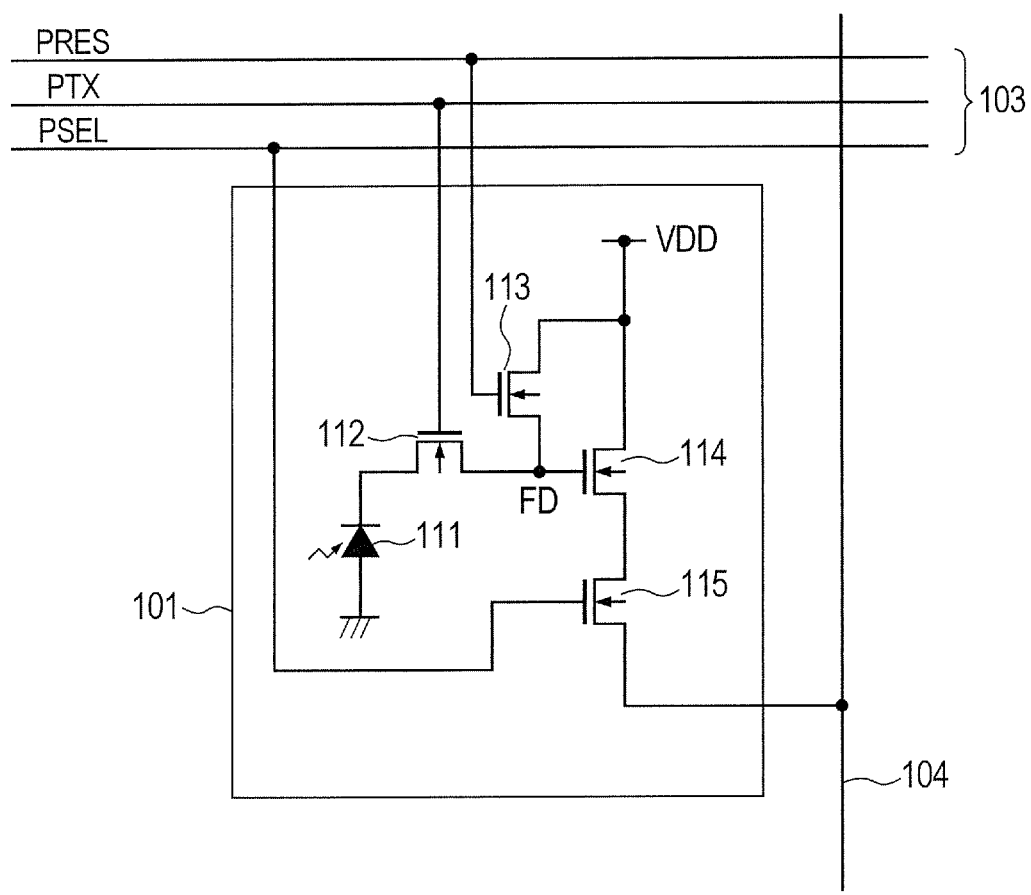
FIG. 2 is a view illustrating a configuration example of a pixel according to an embodiment of the present invention.

The pixel portion 10 has a plurality of pixels 101 each of which includes a photoelectric conversion element, and the pixels are two dimensionally arrayed therein (in row direction and column direction). Each of the pixels 101 has the photoelectric conversion element (photodiode) 111 and a plurality of transistors 112, 113, 114 and 115 therein, for instance, as is illustrated in FIG. 2. The photoelectric conversion element 111 generates an electric charge as a result of photoelectric conversion. The transistor 112 is a transferring transistor for use in the reading out of the electric charge which has been accumulated in the photoelectric conversion element 111, and the conduction/non-conduction (ON/OFF) is controlled by a signal which is supplied through a transfer line PTX that is one of row control lines 103. The transistor 113 is a resetting transistor for resetting the floating diffusion region FD, and the conduction/non-conduction (ON/OFF) is controlled by a signal which is supplied through a reset line PRES that is one of the row control lines 103.

The transistor 114 is a transistor for a source follower, which amplifies the electric charge in the floating diffusion region FD and converts the resultant charge into a signal voltage. The transistor 115 is a transistor for row selection, which selects a row of the pixels which are two dimensionally arrayed, by controlling the connection of the output of the source follower with the vertical output line 104. In the transistor 115 for row selection, conduction/non-conduction (ON/OFF) is controlled by a signal which is supplied thereto through a row selection line PSEL that is one of row control lines 103. A constant current source 102 is a constant current source for a source follower.

The vertical scanning circuit 11 supplies a driving pulse signal to the row control line 103 which are arranged in each row of the pixel. When the driving pulse signal is supplied to the row control line 103, an analog signal is read out to the vertical output line 104 from each pixel 101 included in the corresponding pixel row. In the present embodiment, the reset level of the pixel 101 and the signal level after the photoelectric conversion are read out as analog signals outputted from the pixel portion 10. The timing generating circuit 12 supplies a control signal to each component of the solid-state imaging apparatus, and controls the operation of the solid-state imaging apparatus.

The read out circuit 13 is a circuit for converting the analog signal which has been outputted from the pixel 101 in the pixel portion 10 to the digital signal (A/D conversion); and has an amplifier 131, a comparator 132, a counter 133 and a memory unit 134. The amplifier 131, the comparator 132, the counter 133, and the memory unit 134 are arranged so as to correspond to each column of the pixel portion 10. The amplifier 131 inverts and amplifies the analog signal which has been input from the pixel 101 thereinto through the vertical output line 104, and outputs the amplified analog signal to the comparator 132.

The comparator 132 compares the magnitude of the potentials between the output of the amplifier 131 and the ramp signal ramp outputted from the reference signal generating circuit 14, and outputs a signal of a high level or a signal of a low level according to the comparison result. Accordingly, the comparator 132 shifts the output from the high level to the low level or from the low level to the high level, when the relationship of the magnitudes of the potentials is inverted between the output signal of the amplifier 131 and the ramp signal ramp.

Figure 3:
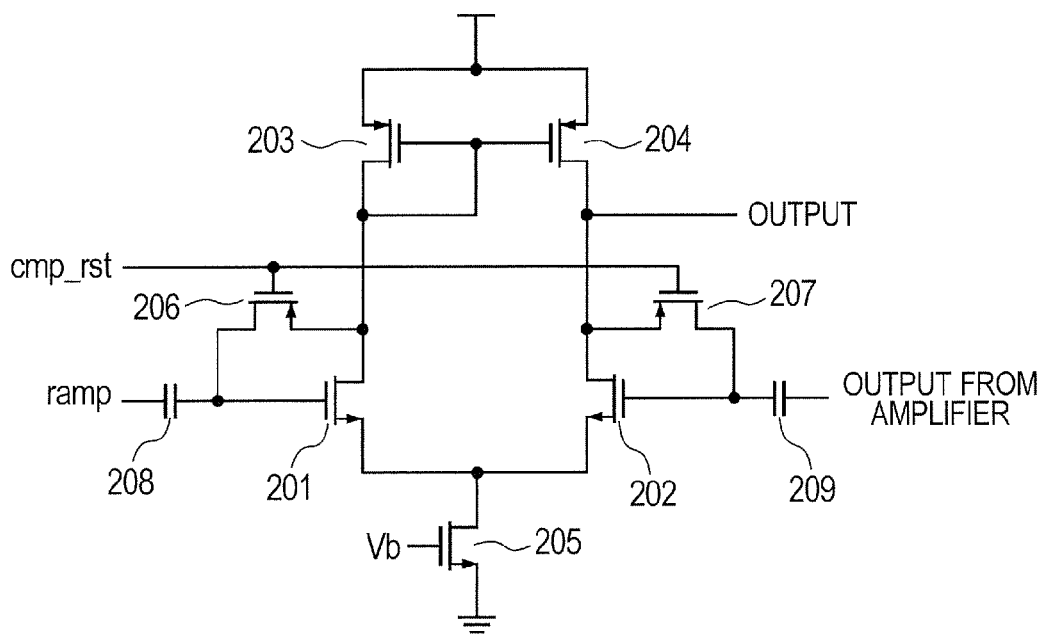
FIG. 3 is a view illustrating a configuration example of a comparator according to an embodiment of the present invention.

FIG. 3 is a view illustrating a configuration example of the comparator 132. The comparator 132 has a differential transistor pair which has NMOS type transistors 201 and 202, and has a load transistor pair which has PMOS type transistors 203 and 204, becomes the output load of the differential transistor pair, and is arranged in a power source side. The comparing unit 132 has an NMOS type of constant current source transistor 205 which supplies a constant operation current to the differential transistor pair and the load transistor pair, and is arranged in a grounded side. In addition, the comparing unit 132 has switch transistors 206 and 207 for resetting an operation point, and capacitors 208 and 209 for coupling a signal.

The sources of the transistors 201 and 202 are connected with the drain of the constant current source transistor 205, in common. A bias voltage Vb is supplied to the gate of the constant current source transistor 205. In addition, a ramp signal ramp is supplied to the gate of the transistor 201 through the capacitor 208, and the output of the amplifier 131 is supplied to the gate of the transistor 202 through the capacitor 209. The drain of the transistor 201 is connected to the drain of the transistor 203, and the drain of transistor 202 is connected to the drain of the transistor 204. The sources of the transistors 203 and 204 are connected to the power source, and the gates of the transistors 203 and 204 are connected to the drain of the transistor 203. The drain of the transistor 204 is connected to an output node of the comparator 132.

The switch transistor 206 is connected between the gate and the drain of the transistor 201, and the switch transistor 207 is connected between the gate and the drain of the transistor 202. A reset signal cmp_rst for resetting the comparator 132 is supplied to the gates of the switch transistors 206 and 207 from the timing generating circuit 12. Before the analog signal outputted from the pixel is converted to the digital signal, the comparator 132 performs a resetting operation of canceling an offset. This resetting operation is performed by controlling the reset signal cmp_rst to a high level, in such a state (voltage Vadj) that the potential of the ramp signal ramp is slightly raised from the ground potential. At this time, the input offset is retained in the capacitors 208 and 209 by shorting the gate and the drain in each of the respective transistors 201 and 202.

The counter 133 performs a counting operation based on the clock cclk outputted from the clock generation circuit 15, and also stops the counting operation at the timing at which the output of the comparator 132 has been inverted. Thereby, as for the count value of the counter 133 in each column, a value is retained which is proportional to a period between the time when the supply of the clock cclk is started and the time when the output of the comparator 132 is inverted, in other words, a value is retained which is proportional to the signal outputted from the pixel 101. Incidentally, the counter 133 resets the count value to an initial value, when the reset pulse cnt_rst is input into the counter 133 form the timing generating circuit 12.

In addition, the counter 133 is an up and down counter which can switch between an up-counting operation and a down-counting operation. In the present embodiment, the counter 133 counts a value in a down-counting mode when converting the analog signal derived of the reset level outputted from the pixel to the digital signal, and counts the value in an up-counting mode when converting the analog signal derived of the signal level outputted from the pixel to the digital signal. Thereby, after the analog signal derived of the signal level outputted from the pixel has been converted to the digital signal, the value derived by removing the reset level from the signal level results in being retained as the count value.

When a transfer pulse mem_tfr is input into a memory unit 134 from the timing generating circuit 12, the memory unit 134 takes in and retains the count value which is retained in the counter 133. When a scanning pulse hst is input into a horizontal scanning circuit 16 from the timing generating circuit 12, the horizontal scanning circuit 16 successively scans and outputs the value which has been taken in each memory unit 134.

Figure 4:
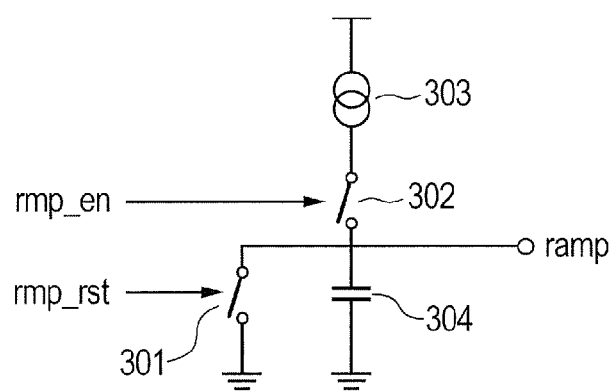
FIG. 4 is a view illustrating a configuration example of a reference signal generating circuit according to an embodiment of the present invention.

The reference signal generating circuit 14 generates a ramp signal ramp which is a reference signal based on the signals rmp_en and rmp_rst outputted from the timing generating circuit 12, and supplies the generated signals to the comparator 132. FIG. 4 illustrates a configuration example of the reference signal generating circuit 14. When a reset signal rmp_rst is input into the reference signal generating circuit 14 from the timing generating circuit 12, a switch 301 is closed, and an output ramp is reset to the ground potential. In addition, an enable signal rmp_en is input into the reference signal generating circuit 14 from the timing generating circuit 12, a switch 302 is closed, a fixed amount of an electric current flows into the capacitor 304 from a current source 303, and an output waveform of which the potential increases with a constant slope is output as an output ramp.

The clock generation circuit 15 synchronizes with the output of the ramp signal ramp outputted from the reference signal generating circuit 14, generates the clock cclk, and supplies the clock cclk to the counter 133. For instance, the clock generation circuit 15 generates and outputs the clock cclk in a period in which the enable signal rmp_en is input into the reference signal generating circuit 14. Incidentally, the clock generation circuit 15 may always generate the clock cclk and supply the clock cclk to the counter 133, and the enable signal which permits the counter 133 to carry out the counting operation may be outputted so as to match with the ramp signal ramp.

The control circuit 17 monitors the digital value which is the result of having converted the analog signal derived of the reset level of the pixel 101 that is outputted from the horizontal scanning circuit 16 to the digital signal. The control circuit 17 outputs a control signal adj based on the obtained A/D conversion value of the reset level of the pixel 101, and adjusts the potential of the ramp signal ramp as a reference potential to be supplied to the comparator 132 when the comparator 132 performs the resetting operation.

Figure 5:
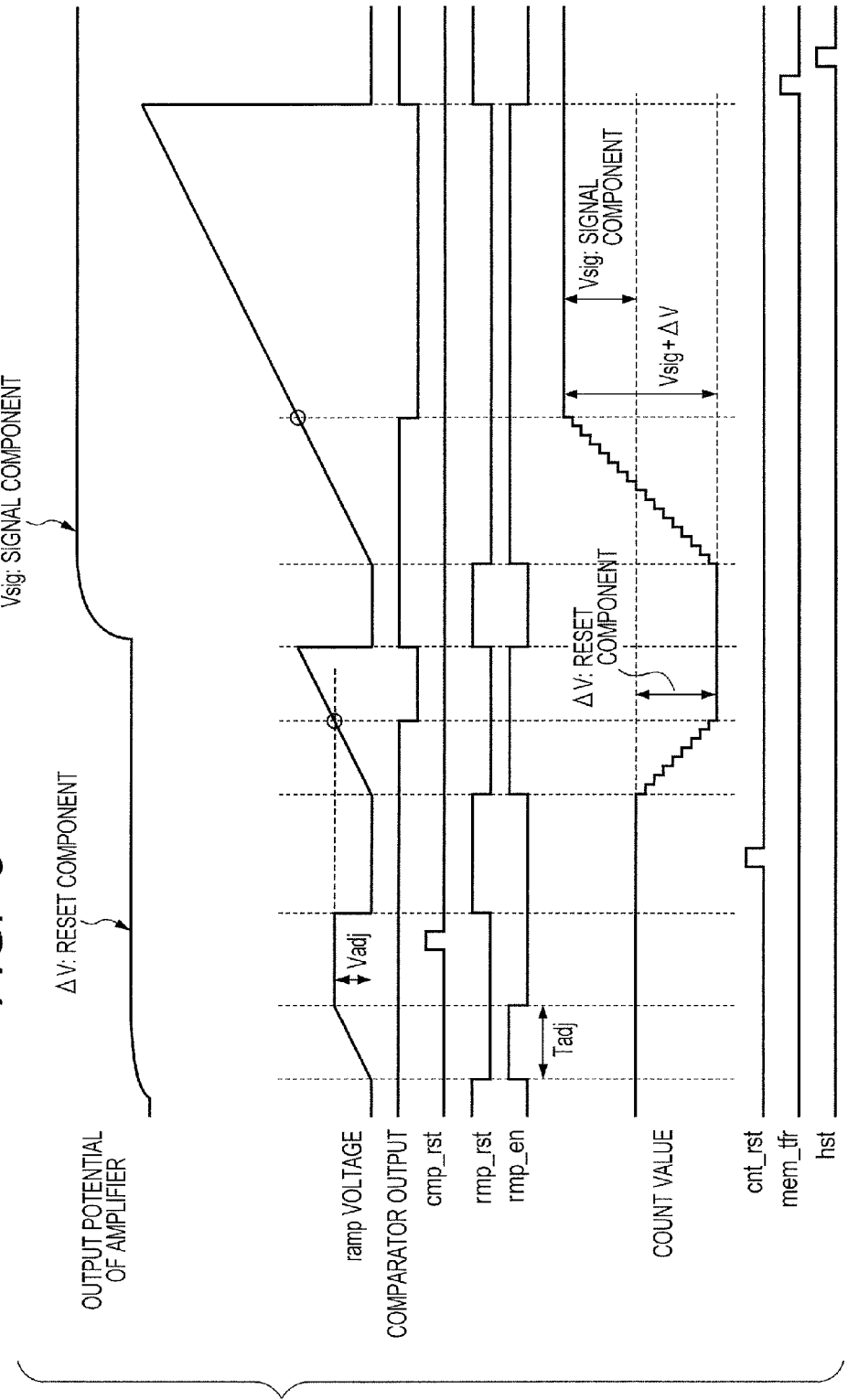
FIG. 5 is a view illustrating a driving timing of the solid-state imaging apparatus according to the first embodiment of the present invention.

Next, the operation of the solid-state imaging apparatus illustrated in FIG. 1 will be described below. FIG. 5 is a view illustrating driving timings of the solid-state imaging apparatus according to the first embodiment, and illustrates an operation of reading out the pixel signals outputted from the pixels 101 for one row of the pixel rows.

Firstly, a signal which is supplied through the row selection line PSEL becomes a high level, thereby the transistor 115 for row selecting is turned on, and the pixel 101 which is arrayed in an arbitrary row is connected to the vertical output line 104. In addition, a signal which is supplied through the reset line PRES becomes a high level, and the floating diffusion region FD of the pixel 101 is reset by the resetting transistor 113. Thereby, the output potential of the amplifier 131 changes according to the reset component ΔV.

Subsequently, the timing generating circuit 12 sets the enable signal rmp_en at a high level only in a period Tadj, and thereby the potential of the ramp signal ramp which is output from the reference signal generating circuit 14 increases and becomes a potential Vadj. In this state, the reset signal cmp_rst outputted from the timing generating circuit 12 becomes a high level, and thereby the resetting operation for canceling the offset is performed in the comparator 132. After that, the reset signal rmp_rst outputted from the timing generating circuit 12 becomes a high level, the ramp signal ramp is reset to the ground potential, and the reset pulse cnt_rst is input into the counter 133, and the count value of the counter 133 is reset to the initial value.

Next, the analog signal derived of the reset level of the pixel 101 is converted to a digital signal. In the A/D conversion processing for the reset level, the reset signal rmp_rst becomes a low level, simultaneously the enable signal rmp_en becomes a high level, and the potential of the ramp signal ramp which is outputted from the reference signal generating circuit 14 increases as time elapses. In addition, the counter 133 starts the counting operation, and the count value decreases as time elapses. When the output potential of the amplifier 131 matches with the potential of the ramp signal ramp, the output of the comparator 132 is inverted, and the counter 133 stops the counting operation. After that, the reset signal rmp_rst becomes a high level, simultaneously the enable signal rmp_en becomes a low level, and the A/D conversion processing for the reset level is finished. Thus, the count value corresponding to the reset component ΔV is retained in the counter 133.

Next, the signal which is supplied through the transfer line PTX becomes a high level, and an electric charge corresponding to the amount of the light incident on the photoelectric conversion element 111 is read out from the photoelectric conversion element 111 through the transferring transistor 112. Thereby, a signal derived of the level in which a signal component Vsig that is a photoelectric conversion output is superimposed on the reset component ΔV of the pixel is read out to the vertical output line 104, and is inverted and amplified by the amplifier 131; and the amplified signal is supplied to the comparator 132.

Next, an analog signal derived of the signal level of the pixel 101 is converted to a digital signal. In the A/D conversion processing for the signal level, the reset signal rmp_rst becomes a low level, simultaneously the enable signal rmp_en becomes the high level, and the potential of the ramp signal ramp which is outputted from the reference signal generating circuit 14 increases as time elapses. In addition, the counter 133 starts the counting operation, and the count value increases as time elapses. When the output potential of the amplifier 131 matches with the potential of the ramp signal ramp, the output of the comparator 132 is inverted, and the counter 133 stops the counting operation. After that, the reset signal rmp_rst becomes a high level, simultaneously the enable signal rmp_en becomes a low level, and the A/D conversion processing for the signal level is finished.

According to the above operation, a value derived by removing the reset level from the signal level of the pixel is retained in the counter 133 as a count value. After that, a transfer pulse mem_tfr outputted from the timing generating circuit 12 is input into the memory unit 134, and thereby the count value retained in the counter 133 is taken into the memory unit 134. Furthermore, a scanning pulse hst outputted from the timing generating circuit 12 is input into the horizontal scanning circuit 16, and thereby the values which have been taken into each memory unit 134 are successively read out and are output.

Here, when the potential of the ramp signal ramp is set at the center of a voltage range in which the ramp signal ramp is swept when the analog signal derived of the reset level is converted to a digital signal, and the comparator 132 is reset, ideally, the A/D conversion value of the reset level of the pixel 101 becomes a middle value of the output range. In other words, when the analog signal derived of the reset level of the pixel 101 is converted to the digital signal, the output of the comparator 132 is inverted when the potential ramp of the ramp signal to be input becomes the same potential as the potential Vadj of the ramp signal ramp when the comparator 132 is reset.

Figure 6:
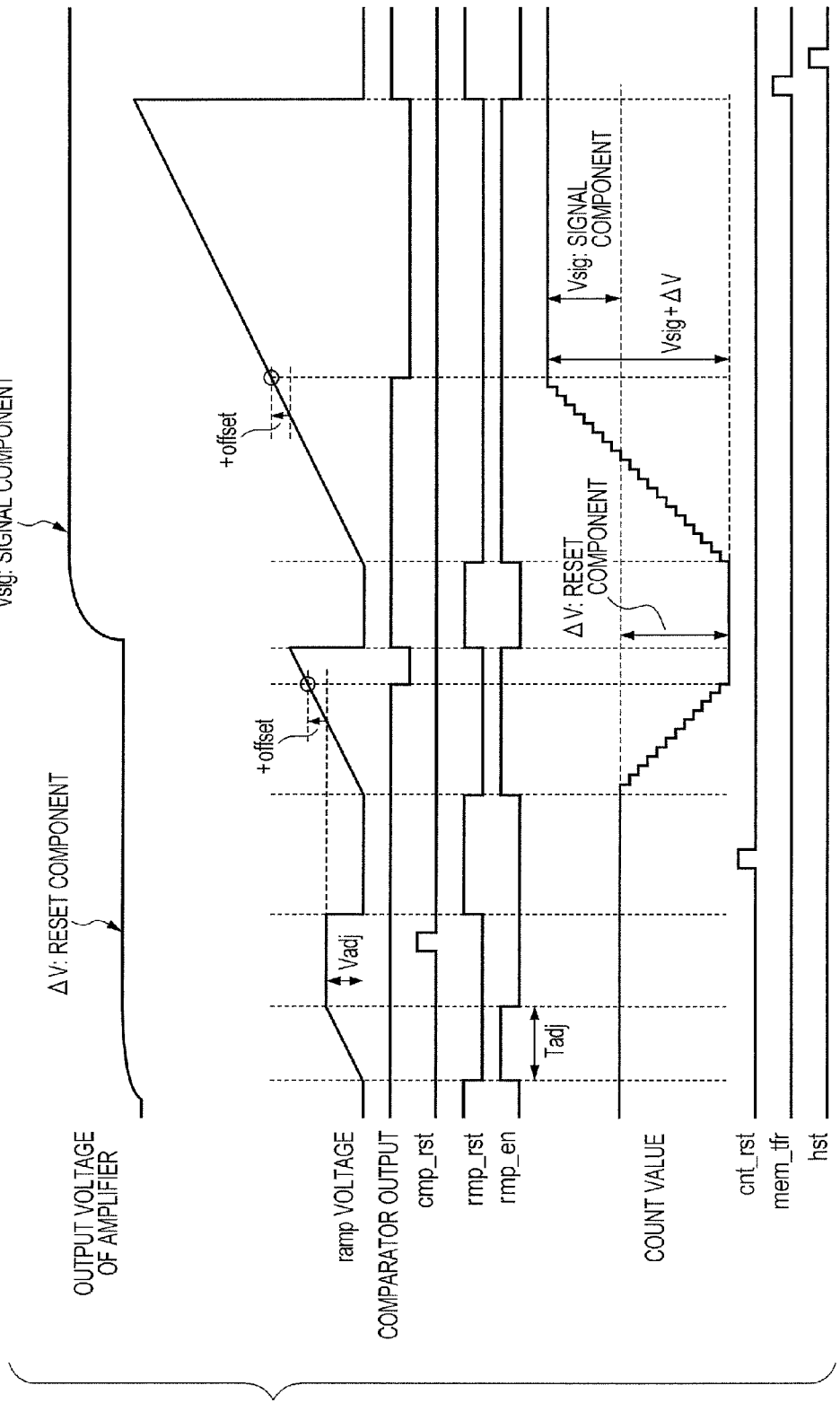
FIG. 6 is a view illustrating a driving waveform when a plus offset has been added to the comparator.
Figure 7:
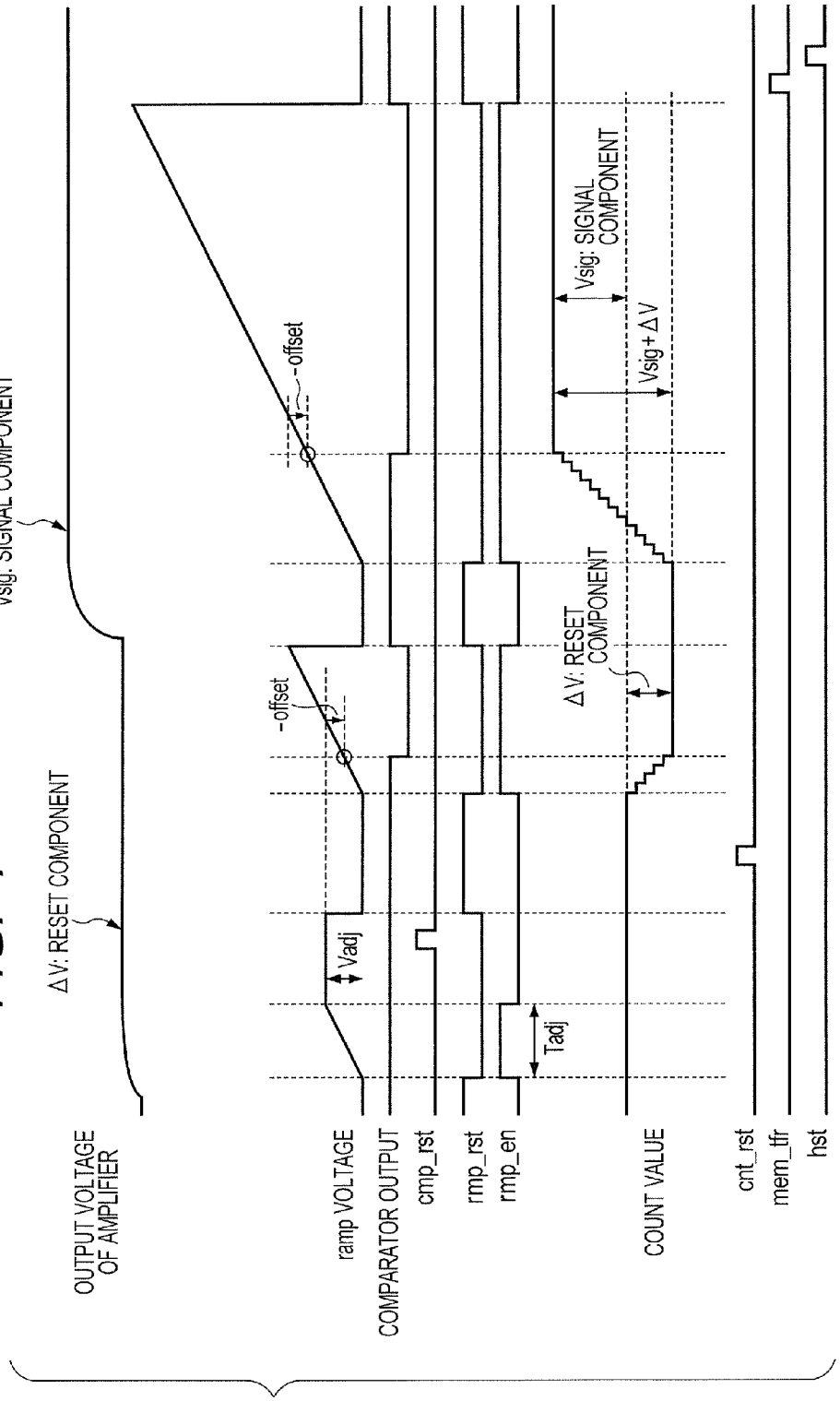
FIG. 7 is a view illustrating a driving waveform when a minus offset has been added to the comparator.

However, the offset of the comparator 132 is not always completely canceled, but the input offset occasionally remains due to charge injection, clock feed through or the like. When the offset is added to a plus side in the comparator 132, for instance, a period of the operation before the output of the comparator 132 is inverted becomes longer just by the amount of the offset, and a margin in the upper side of the range of the A/D conversion for the signal derived of the reset level decreases as is illustrated in FIG. 6. In addition, when the offset is added to a minus side in the comparator 132, for instance, a period of the operation before the output of the comparator 132 is inverted becomes shorter just by the amount of the offset, and accordingly a margin in the lower side of the range of the A/D conversion for the signal derived of the reset level decreases as is illustrated in FIG. 7. This offset fluctuates, for instance, due to the deviation of the threshold of the MOS transistor, which originates in product variation, and due to the deviation of the capacitance value, thermal drift and the like.

Figure 8:
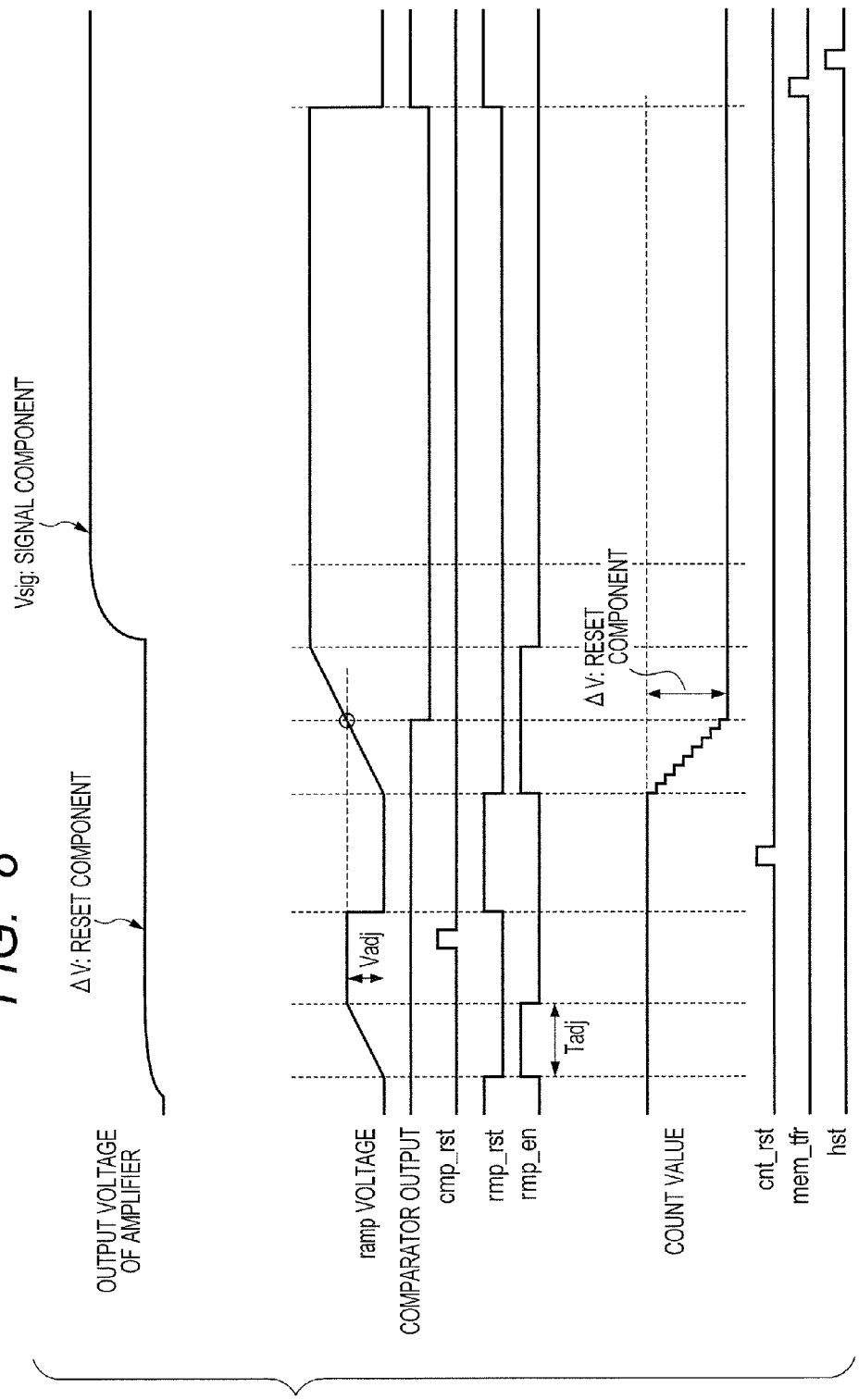
FIG. 8 is a view illustrating a driving timing which relates to the detection of a reference potential in the first embodiment.

Then, the solid-state imaging apparatus in the present embodiment performs a driving operation as illustrated in FIG. 8, and thereby sets an adequate potential Vadj by adjusting the potential Vadj of the ramp signal ramp of a reference potential which is supplied in the operation of resetting the comparator 132, while making the potential Vadj follow the fluctuation of the reset levels of the pixels 101. In other words, the solid-state imaging apparatus outputs the A/D conversion value of the reset level by making the counter 133 not to convert the analog signal derived of the signal level of the pixel 101 to a digital signal but to retain the A/D conversion result of the reset level therein in the state, and to output through the memory unit 134 and the horizontal scanning circuit 16. Thereby, the solid-state imaging apparatus can obtain the variation of the signal derived of the reset level of the pixel 101 including the offset in the comparator 132, and can control the potential Vadj of the ramp signal ramp while performing feedback in the operation of resetting the comparator 132.

Figure 9:
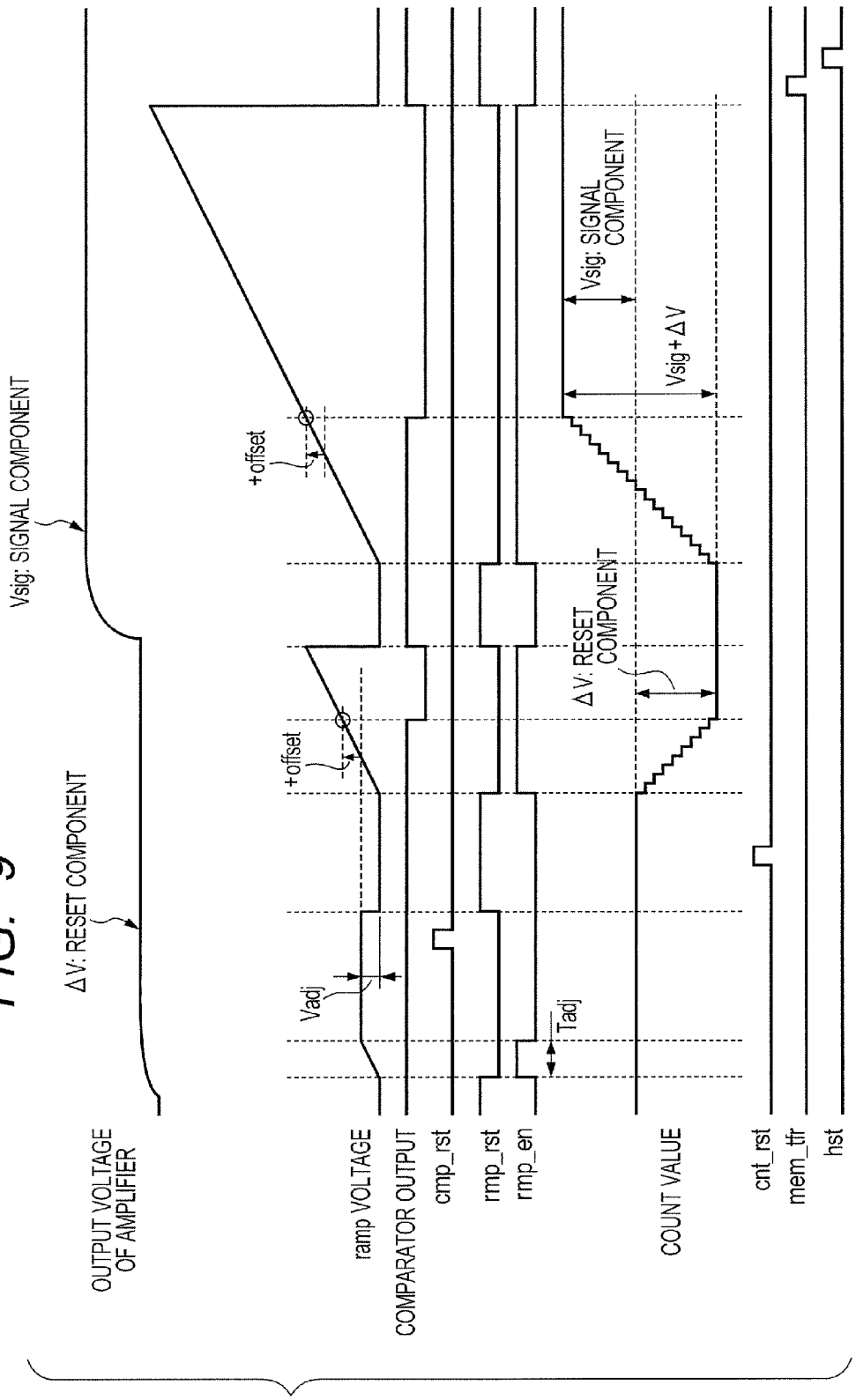
FIG. 9 is a view illustrating a driving timing of the solid-state imaging apparatus according to the first embodiment.

For instance, a control example in the case when the offset is not canceled and is added to the plus side in the comparator 132 will be described below with reference to FIG. 9. When the offset is added to the plus side, a period of the operation before the output of the comparator 132 is inverted becomes longer by the amount of the offset as is illustrated in FIG. 6, if the potential Vadj of the ramp signal ramp is not adjusted in the operation of resetting the comparator 132. In other words, the A/D conversion value of the reset level of the pixel 101 becomes smaller than a desired value.

The control circuit 17 obtains the A/D conversion value of the reset level of the pixel 101, which is outputted from the horizontal scanning circuit 16, at a predetermined timing. When the obtained A/D conversion value is smaller than a predetermined threshold, the control circuit 17 outputs a control signal adj so that the reference signal generating circuit 14 shortens a period Tadj and lowers the potential Vadj of the ramp signal ramp to be sent when the comparator 132 is reset. The predetermined threshold is, for instance, a middle value of the output range. Thus, the control circuit 17 can move the timing forward at which the output of the comparator 132 is inverted when the analog signal derived of the reset level of the pixel 101 is converted to the digital signal, by adjusting the reference potential of the comparator 132. Accordingly, the control circuit 17 can cancel a period of time by which the timing when the output of the comparator 132 is inverted delays due to the offset added to the plus side, and can set the A/D conversion value of the reset level of the pixel 101 in the vicinity of the center of the output range.

Figure 10:
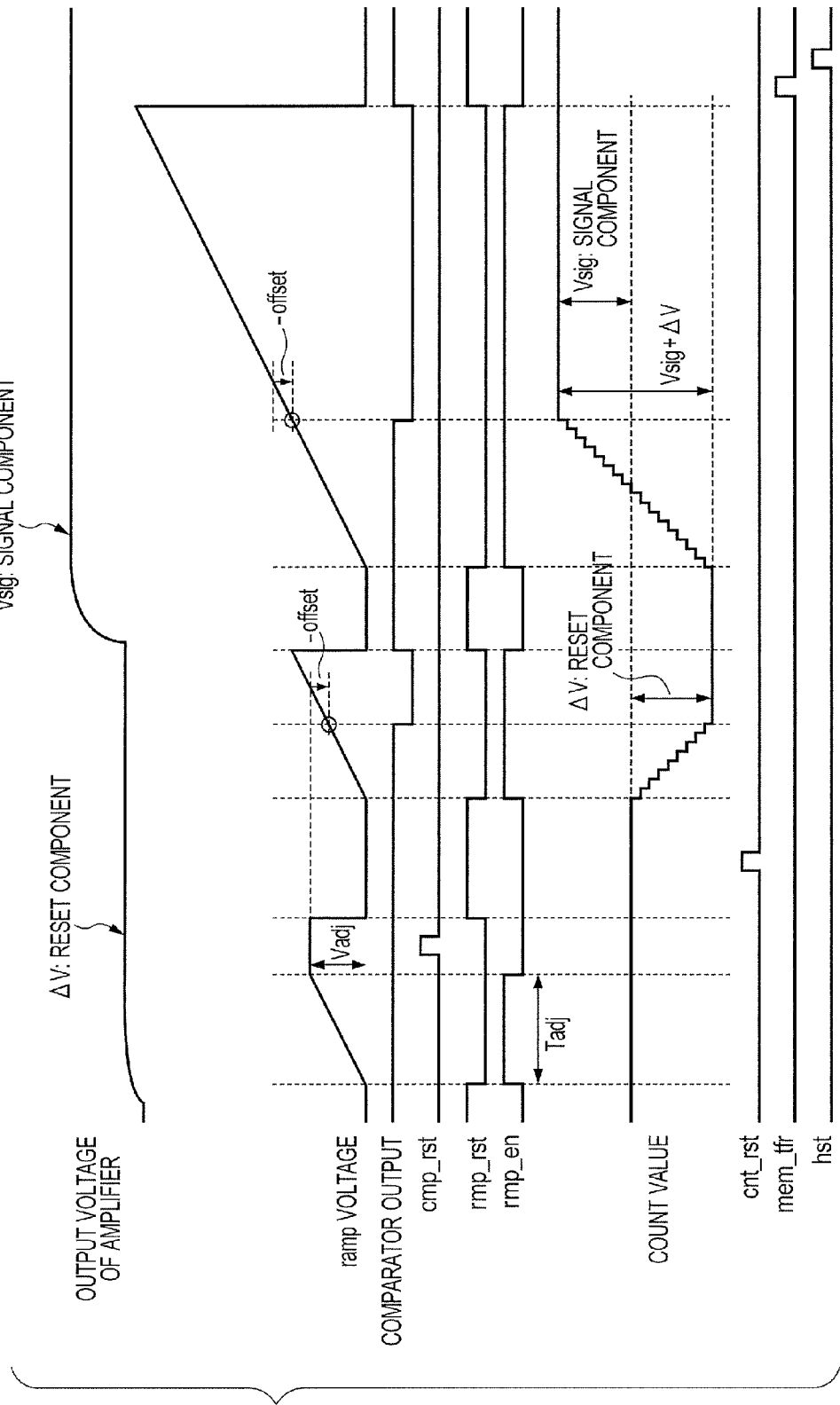
FIG. 10 is a view illustrating a driving timing of the solid-state imaging apparatus according to the first embodiment.

Next, a control example in the case when the offset is not canceled and is added to the minus side in the comparator 132, for instance, will be described below with reference to FIG. 10. When the offset is added to the minus side, a period of the operation before the output of the comparator 132 is inverted becomes shorter by the amount of the offset as is illustrated in FIG. 7, if the potential Vadj of the ramp signal ramp is not adjusted in the operation of resetting the comparator 132. In other words, the A/D conversion value of the reset level of the pixel 101 becomes larger than a desired value.

The control circuit 17 obtains the A/D conversion value of the reset level of the pixel 101, which is outputted from the horizontal scanning circuit 16, at a predetermined timing. When the obtained A/D conversion value is larger than a predetermined threshold, the control circuit 17 outputs a control signal adj so that the reference signal generating circuit 14 elongates a period Tadj and heightens the potential Vadj of the ramp signal ramp to be sent when the comparator 132 is reset. The predetermined threshold is, for instance, the middle value of the output range. Thus, the control circuit 17 can move the timing back at which the output of the comparator 132 is inverted when the analog signal derived of the reset level of the pixel 101 is converted to the digital signal, by adjusting the reference potential of the comparator 132. Accordingly, the control circuit 17 can cancel a period of time by which the timing when the output of the comparator 132 is inverted advances due to the offset added to the minus side, and can set the A/D conversion value of the reset level of the pixel 101 in the vicinity of the center of the output range.

According to the present embodiment, the control circuit 17 obtains the A/D conversion value of the reset level of the pixel 101, and controls the potential Vadj of the ramp signal ramp to be sent when the comparator 132 is reset, according to the A/D conversion value. Thereby, the driving method can make the dynamic range of the A/D conversion follow the fluctuation of the reset level of the pixel 101, and can surely convert the analog signal derived of the reset level to the digital signal, without elongating the A/D conversion period of time, while suppressing the lowering of the speed at which an image signal is read out.

Incidentally, it can be appropriately altered as needed at which timing the driving operation as illustrated in FIG. 8 is performed, in other words, at which timing the acquisition operation of the A/D conversion value of the reset level of the pixel 101 is performed. For instance, the driving operation as illustrated in FIG. 8 may be performed once for each one row of the pixels 101 in the pixel portion 10. Alternately, the driving operation as illustrated in FIG. 8 may be performed for the first one row every time an image is taken, and the result may be fed back to the next row. Further alternately, a frame in which the driving operation as illustrated in FIG. 8 is performed may be inserted every time some frames are taken, and the result may be fed back to the next frame. Further alternately, the driving operation as illustrated in FIG. 8 may be performed every time a user pushes an imaging button.

The solid-state imaging apparatus controls the potential Vadj at a real time so that the A/D conversion value of the reset level of the pixel 101 always becomes in the vicinity of the center of the A/D conversion range, while performing feed back by using a technology as described above. Thereby, the solid-state imaging apparatus can cancel the fluctuation of the reset level of the pixel, which occurs due to product variation, thermal drift, change with time or the like. Then, the solid-state imaging apparatus does not need to secure a wide dynamic range concerning the A/D conversion of the reset level vainly, and can suppress the increase of the period of time for reading out the pixel signal.

(Second Embodiment)

Next, a second embodiment of the present invention will be described below.

Figure 11:
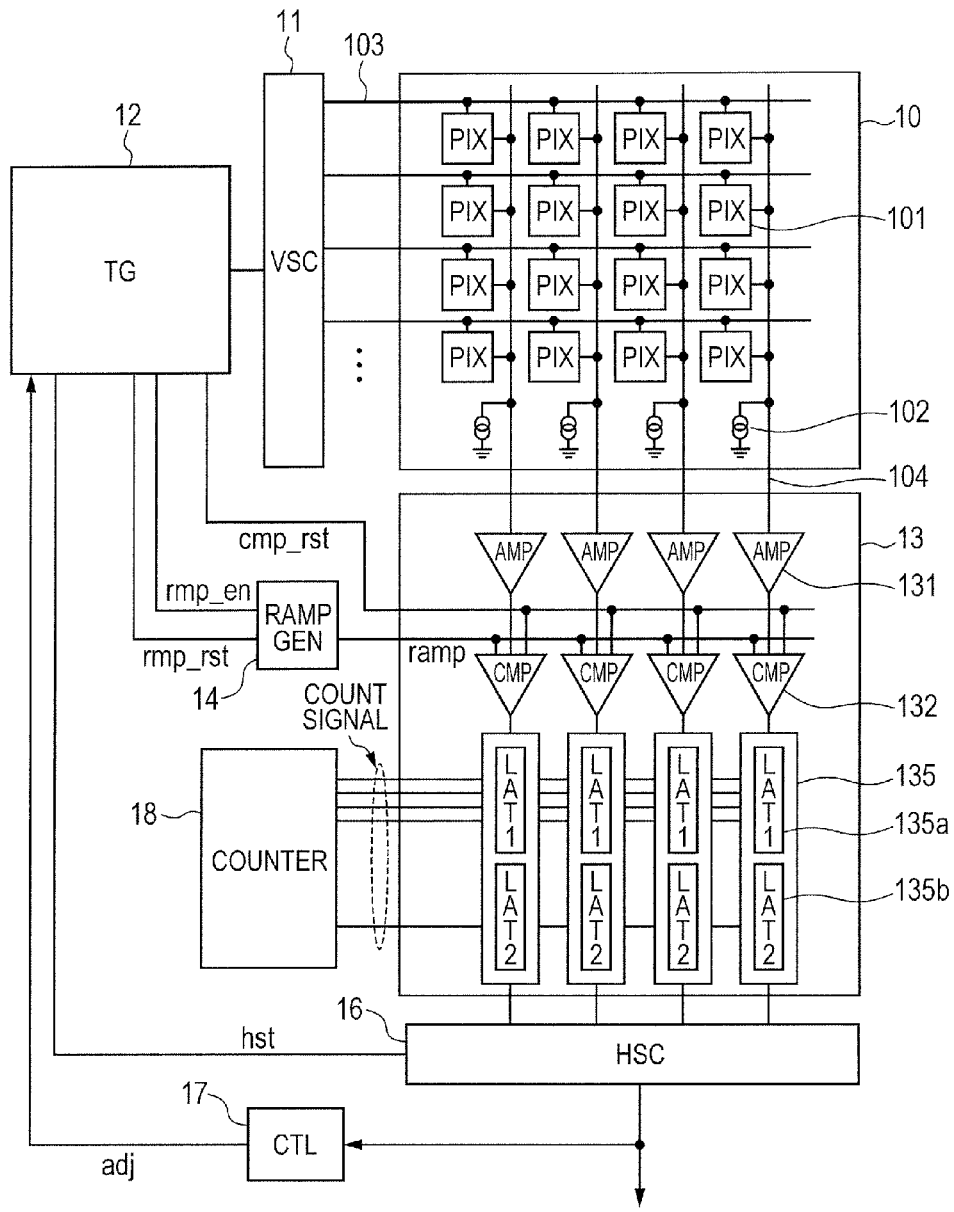
FIG. 11 is a view illustrating a configuration example of a solid-state imaging apparatus according to a second embodiment of the present invention.

FIG. 11 is a view illustrating a configuration example of a solid-state imaging apparatus according to the second embodiment. In this FIG. 11, the components having the same function as that of the components illustrated in FIG. 1 are designated by the same reference numerals, and overlapping descriptions will be omitted.

The solid-state imaging apparatus according to the second embodiment has a pixel portion 10, a vertical scanning circuit 11, a timing generating circuit 12, a read out circuit 13, a reference signal generating circuit 14, a horizontal scanning circuit 16, a control circuit 17 and a counter 18 therein. The counter 18 is a counter which is used commonly in each pixel column. The counter 18 performs a counting operation while corresponding to the change of the ramp signal ramp outputted from the reference signal generating circuit 14, and distributes the count value to each pixel column according to a count signal.

The read out circuit 13 in the second embodiment has also an amplifier 131, a comparator 132 and a latch unit 135. The latch unit 135 has a first latch circuit 135a and a second latch circuit 135b, and takes in and retains the count value at the time when the output of the comparator 132 has been inverted. Thereby, a value proportional to a period of time before the output signal of the comparator 132 is inverted is retained in the latch unit 135, in other words, a value proportional to the signal outputted from the pixel 101 is retained there. The first latch circuit 135a retains the reset level of the pixel 101, and the second latch circuit 135b retains the signal level of the pixel 101. The value retained in the first latch circuit 135a and the value retained in the second latch circuit 135b are successively read out and are transferred to the outside by the horizontal scanning circuit 16, and the difference between the values is calculated by an exterior unit. Thereby, only a pure signal level that the reset level has been removed from the signal level can be known.

Figure 12:
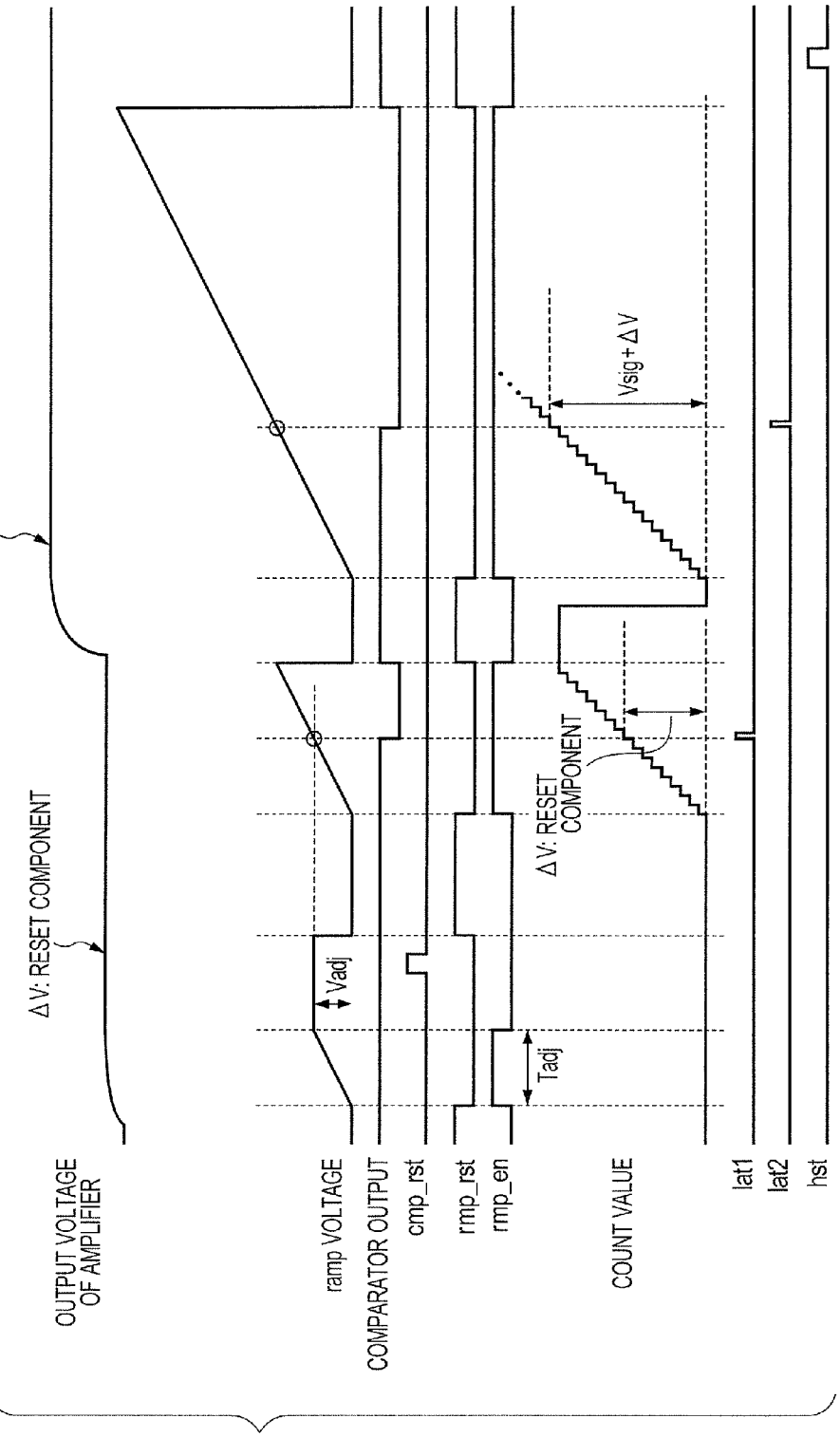
FIG. 12 is a view illustrating a driving timing of the solid-state imaging apparatus according to the second embodiment of the present invention.

FIG. 12 is a view illustrating a driving timing of the solid-state imaging apparatus according to the second embodiment, and illustrates a reading out operation of the pixel signal outputted from the pixels 101 in one row of the pixel rows. In each of the A/D conversion processing for the reset level of the pixel 101 and the A/D conversion processing for the signal level of the pixel 101, the counter 18 starts the counting operation from an initial value. In addition, in the A/D conversion processing for the reset level of the pixel 101, when the output potential of the amplifier 131 matches with the potential of the ramp signal ramp, and the output of the comparator 132 is inverted, a latch pulse lat1 is output, and the count value at that time is retained in the first latch circuit 135a. In addition, in the A/D conversion processing for the signal level of the pixel 101, when the output potential of the amplifier 131 matches with the potential of the ramp signal ramp, and the output of the comparator 132 is inverted, a latch pulse lat2 is output, and the count value at that time is retained in the second latch circuit 135b. Other points are the same as those of the first embodiment.

In the second embodiment, each of the A/D conversion value of the reset level of the pixel 101 and the A/D conversion value of the signal level of the pixel 101 are always output to the outside, and accordingly the control circuit 17 can know the A/D conversion value of the reset level at the present time at any time. Accordingly, the control circuit 17 can appropriately control the potential Vadj of the ramp signal ramp of a reference potential which is supplied in the operation of resetting the comparator 132, at an arbitrary timing.

Incidentally, the method in which the control circuit 17 controls the potential Vadj is similar to that in the first embodiment, but it is different that the counter 18 uses the determination result of the magnitude relationship between the obtained A/D conversion value and a predetermined threshold in a reverse way, because the counter 18 is an up counter. In other words, when the obtained A/D conversion value is larger than the predetermined threshold, the control circuit 17 outputs a control signal adj so that the reference signal generating circuit 14 shortens a period Tadj and lowers the potential Vadj of the ramp signal ramp to be sent when the comparator 132 is reset. In addition, when the obtained A/D conversion value is smaller than the predetermined threshold, the control circuit 17 outputs a control signal adj so that the reference signal generating circuit 14 elongates a period Tadj and heightens the potential Vadj of the ramp signal ramp to be sent when the comparator 132 is reset.

According to the second embodiment, the solid-state imaging apparatus can adjust the position at which the output of the comparator 132 is inverted in the A/D conversion of the reset level of the pixel, by performing the feed back control based on the A/D conversion value of the reset level of the pixel 101 at the present time at any time during taking an image. Thereby, the driving method can make the dynamic range of the A/D conversion follow the fluctuation of the reset level of the pixel 101, and can surely convert the analog signal derived of the reset level to the digital signal, without elongating the A/D conversion period of time, while suppressing the lowering of the speed at which an image signal is read out.

Note that the above embodiments are merely examples how the present invention can be practiced, and the technical scope of the present invention should not be restrictedly interpreted by the embodiments. In other words, the present invention can be practiced in various ways without departing from the technical concept and main features of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-008325, filed Jan. 18, 2012, which is hereby incorporated by reference herein in its entirety.

What is claimed is:

1. A solid-state imaging apparatus comprising:
   a plurality of pixels arranged two dimensionally;
   a reference signal generating circuit configured to generate a reference signal of which voltage changes monotonically with time;
   a counter performing a counting operation according to the changing of the reference signal;
   a read out circuit having a comparator comparing between a signal derived of the pixel and the reference signal, and analog-to-digital converting the signal outputted from the pixel based on an output from the comparator and a count value of the counter, so as to perform an operation of analog-to-digital conversion of a reset level of the pixel, and to perform an operation of analog-to-digital conversion of the signal derived of the pixel; and
   a control circuit configured to obtain a conversion value obtained by the analog-to-digital conversion of the reset level of the pixel, and to adjust, based on the conversion value, a reference voltage based on which the comparator is reset.

2. The solid-state imaging apparatus according to claim 1, wherein
   the control circuit compares the conversion value with a predetermined threshold, and adjusts the reference voltage based on which the comparator is reset.

3. The solid-state imaging apparatus according to claim 2, wherein
   the predetermined threshold is a middle value within an output range of the conversion value obtained by the analog-to-digital conversion of the reset level of the pixel.

4. The solid-state imaging apparatus according to claim 1, wherein
   the control circuit obtains the conversion value once for every one row of the plurality of pixels arranged two dimensionally.

5. The solid-state imaging apparatus according to claim 1, wherein
the control circuit obtains the conversion value once for every one frame of an imaging.

6. The solid-state imaging apparatus according to claim 1, wherein
the plurality of pixels arranged two dimensionally include at least one row of the pixels from which the control circuit obtain the conversion value.

7. The solid-state imaging apparatus according to claim 1, wherein
a plurality of the read out circuits are arranged each one corresponding to each one column of the plurality of pixels.

8. A method for driving a solid-state imaging apparatus comprising:
a plurality of pixels arranged two dimensionally;
a reference signal generating circuit configured to generate a reference signal of which voltage changes monotonically with time;
a counter performing a counting operation according to the changing of the reference signal; and
a read out circuit having a comparator comparing between a signal derived of the pixel and the reference signal, and analog-to-digital converting the signal outputted from the pixel based on an output from the comparator and a count value of the counter, wherein the method comprises steps of:

performing an operation of analog-to-digital conversion of a reset level of the pixel;

performing an operation of analog-to-digital conversion of the signal outputted from the pixel; and acquiring a conversion value obtained by the analog-to-digital conversion of the reset level of the pixel, to adjust, based on the conversion value, a reference voltage based on which the comparator is reset.

* * * * *